(12) United States Patent  
Kuhn et al.

(10) Patent No.: US 8,923,495 B2
(45) Date of Patent: *Dec. 30, 2014

(54) METHOD AND APPARATUS FOR ADMINISTRATION OF CIRCUIT INVENTORIES IN TELECOMMUNICATIONS NETWORKS

(75) Inventors: Robert C. Kuhn, Dillsburg, PA (US); Michael F. Gleason, Fairfield, PA (US)

(73) Assignee: TSR Incorporated, Camp Hill, PA (US)

( * ) Notice: Subject to any disclaimer, the term of this patent is extended or adjusted under 35 U.S.C. 154(b) by 741 days.

This patent is subject to a terminal disclaimer.

(21) Appl. No.: 12/647,878

(22) Filed: Dec. 28, 2009

(65) Prior Publication Data

US 2010/0158224 A1    Jun. 24, 2010

Related U.S. Application Data

(63) Continuation of application No. 11/113,057, filed on Apr. 25, 2005, now Pat. No. 7,664,240, which is a continuation of application No. 09/456,311, filed on Dec. 8, 1999, now Pat. No. 6,891,937.

(51) Int. Cl.
*H04M 15/00* (2006.01)
*G06Q 30/04* (2012.01)
*H04M 15/04* (2006.01)

(52) U.S. Cl.
CPC .............. *G06Q 30/04* (2013.01); *H04M 15/00* (2013.01); *H04M 15/04* (2013.01); *H04M 15/41* (2013.01); *H04M 15/43* (2013.01); *H04M 15/44* (2013.01); *H04M 15/53* (2013.01); *H04M 15/725* (2013.01); *H04M 15/745* (2013.01); *H04M 2215/0104* (2013.01); *H04M 2215/0108* (2013.01); *H04M 2215/0164* (2013.01); *H04M 2215/0172* (2013.01); *H04M 2215/7063* (2013.01)
USPC ................................ 379/115.01; 379/121.01

(58) Field of Classification Search
CPC ...... H04M 15/00; H04M 15/41; H04M 15/44
USPC .............. 379/114.01–114.05, 121.02–127.05
See application file for complete search history.

(56) References Cited

U.S. PATENT DOCUMENTS

| | | |
|---|---|---|
| 5,392,328 A | 2/1995 | Schmidt et al. |
| 5,619,562 A | 4/1997 | Maurer et al. |
| 5,640,505 A | 6/1997 | Hearn et al. |
| 5,687,212 A | 11/1997 | Kinser, Jr. et al. |
| 5,687,224 A | 11/1997 | Alley, Jr. et al. |

(Continued)

*Primary Examiner* — Joseph T Phan
(74) *Attorney, Agent, or Firm* — Dickstein Shapiro LLP

(57) ABSTRACT

Telecommunications customers must frequently utilize the facilities of many different telecommunications service providers in order to transmit data from one location to another. When a telecommunications customer encounters a network problem, that customer usually must navigate a complicated web of service providers and equipment owners in order to receive meaningful technical assistance from a human technician. The present invention is designed and intended to facilitate human interactions for technical support and administrative tasks by associating customer, contract, circuit, equipment, key personnel, billing, and telco information in a database for efficient data presentation and information retrieval. Resolution of the logistical problem of tracking circuit information is achieved by organizing the information and displaying important data concurrently. Toward that end, the system modules comprising the invention share all of the circuit inventory data available, and graphical user interfaces for each module display relevant information together. Examples of features in the present invention include: simultaneous display of circuit and contact information for key personnel, a reminder function for tracking changes in important service characteristics, and customer-specific formatting for billing.

19 Claims, 12 Drawing Sheets

(56) References Cited

U.S. PATENT DOCUMENTS

| | | |
|---|---|---|
| 5,761,432 A | 6/1998 | Bergholm et al. |
| 5,774,689 A | 6/1998 | Curtis et al. |
| 5,790,633 A | 8/1998 | Kinser, Jr. et al. |
| 5,790,634 A | 8/1998 | Kinser, Jr. et al. |
| 5,835,580 A | 11/1998 | Fraser |
| 5,852,812 A | 12/1998 | Reeder |
| 5,956,024 A | 9/1999 | Strickland et al. |
| 6,047,051 A | 4/2000 | Ginzboorg et al. |
| 6,072,493 A | 6/2000 | Driskell et al. |
| 6,128,602 A | 10/2000 | Northington et al. |
| 6,243,451 B1 | 6/2001 | Shah et al. |
| 6,249,571 B1 | 6/2001 | Rojas |
| 6,266,401 B1 * | 7/2001 | Marchbanks et al. ........ 379/116 |
| 6,363,141 B1 * | 3/2002 | Stubing ........................ 379/116 |
| 6,535,593 B1 * | 3/2003 | Cashiola ................... 379/121.01 |
| 6,668,046 B1 * | 12/2003 | Albal ........................... 379/119 |
| 6,985,569 B2 * | 1/2006 | Baker .......................... 379/126 |
| 7,136,467 B2 | 11/2006 | Brockman et al. |
| 7,177,837 B2 * | 2/2007 | Pegaz-Paquet et al. ......... 705/40 |
| 7,725,097 B2 * | 5/2010 | Koskinen et al. ............. 455/406 |
| 8,010,082 B2 * | 8/2011 | Sutaria et al. ................ 455/408 |

\* cited by examiner

FIG. 7

CIRCUIT PRO

POC VIEWING

○ CONTRACT PERSONNEL ⊙ SITE CONTACTS ○ TELCO REPRESENTATIVES ○ EQUIPMENT VENDORS

○ VIEW ALL SITE CONTACTS
○ VIEW ALL SITE CONTACTS FOR A SPECIFIC CUSTOMER [ATF ▼]
⊙
○ VIEW ALL SITE CONTACTS FOR A SPECIFIC CONTRACT AND SPECIFIC CIRCUIT [ATF ▼]
○ VIEW ALL SITE CONTACTS FOR A SPECIFIC CONTRACT AND SPECIFIC CITY

| LOCATION | NAME | PHONE NO. | EXT. | FAX NO. | E-MAIL ADDRESS. |
|---|---|---|---|---|---|
| HARRISBURG | DOE, JOHN L. | | | | |
| PHILADELPHIA | MARTIN, ALEXIS L. | (215) 555-1001 | 312 | (215) 555-1082 | ALEXMARTIN@ |
| YORK | SMITH, KIMBERLY M. | (717) 555-1083 | | (717) 555-1908 | KSMITH@MAIL |

STATUS  8/20/99  11:50AM

METHOD AND APPARATUS FOR ADMINISTRATION OF CIRCUIT INVENTORIES IN TELECOMMUNICATIONS NETWORKS

This application is a continuation of U.S. application Ser. No. 11/113,057, filed Apr. 25, 2005 now U.S. Pat. No. 7,664, 240, which is a continuation of U.S. application Ser. No. 09/456,311, filed Dec. 8, 1999, now U.S. Pat. No. 6,891,937, the disclosures of which are hereby incorporated by reference.

I. FIELD OF THE INVENTION

The present invention relates to telecommunications systems, and more particularly, to telecommunications circuit provisioning systems.

II. COPYRIGHT NOTICE

A portion of the disclosure of this patent document contains material which is subject to copyright protection. In particular, FIGS. 7, 8 and 9 are copyrighted. The copyright owner has no objection to the facsimile reproduction by anyone of the patent document or the patent disclosure, as it appears in the Patent and Trademark Office patent file or records, but otherwise reserves all copyright rights whatsoever.

III. TECHNICAL BACKGROUND

Traditionally, telecommunications service providers (telcos) shielded telecommunications customers from the logistical problems associated with using the facilities of other telcos. The customer transacted business directly with the local service provider. The local telco settled remote repair and billing questions and included these costs in their service rates.

The Telecommunications Act of 1996 created a new competitive arena for the procurement of telecommunications services. In order to reduce network access costs, some customers have opted to contract directly for network access with remote telcos along frequently-used data routes. The result is a telecommunications industry that is highly fragmented in terms of ownership and usage of networks. Many different telecommunications service providers own the multitudinous pieces of equipment composing the various data transmission networks that span the globe. Telecommunications customers must frequently utilize the facilities of many different telecommunications service providers in order to transmit data from one location to another. For example, to transmit data along a single circuit from New York City to Los Angeles, several different telecommunications service companies will likely be required to provide access to their equipment to complete the transmission. When a telecommunications customer encounters a network problem, that customer usually must navigate a complicated web of service providers and equipment owners in order to receive meaningful technical assistance from a human technician.

To solve the increased complexity of circuit design and maintenance a number of automated systems have been proposed. These prior art systems rely heavily on computers to organize and track circuit designs, which although may appear efficient is useless in the highly competitive and secretive nature of the telcos. The increased fragmentation amongst telcos has also led to an increased fragmentation of the computing systems that are used. Each telco almost always has a unique proprietary system that it is unwilling to share with other telcos. Thus, the prior art systems fail to account for the reality of a fragmented telco system and fail to offer the customer any real practical solutions.

One example of a commonly-used system is the Access Request Management System (ARMS), described in U.S. Pat. No. 5,687,224, which receives circuit order information and reduces it to a convenient format for implementation by other system components or personnel. The ARMS includes an order entry database for tracking conventional and special requests for telecommunications services from the circuit creation stage to the design and implementation stages.

Another known computer system for order management is the Trunks Integrated Record Keeping System (TIRKS) developed by Bellcore. TIRKS is a mainframe-based system which provides circuit order control, circuit design support, inventory record maintenance, selection and assignment of components from inventory, and preparation and distribution of circuit work orders. TIRKS runs only on a mainframe computer system. Generally, TIRKS receives circuit orders in an order control module which controls message/trunk, special service, and carrier system orders by tracking critical dates as the order is processed through completion. The order control module communicates with a circuit provisioning system which operates in conjunction with other TIRKS components to assign facility and equipment information for circuit orders and design circuits. Under certain conditions, TIRKS provides automated design criteria for particular circuit orders. The circuit design generated by TIRKS is communicated to a plant or field for implementation, and the plant also informs the order control module of the circuit implementation for tracking purposes.

U.S. Pat. No. 5,687,224 (hereinafter '224) discloses a circuit provisioning system oriented toward the task of continuing to use certain legacy computer systems while updating the method to take advantage of the flexibility of distributed systems. The output of the '224 patent is a set of design layout records and other information required for the initial stage of circuit provisioning: circuit creation and implementation. This system is not intended for monitoring completed circuits after the implementation stage.

U.S. Pat. No. 5,640,505 (hereinafter '505) discloses a method and apparatus for performing administrative network tasks entirely by computer, including billing services. The '505 patent provides a comprehensive operational support structure for services and technologies associated with a telecommunications network. The support structure includes the capability to receive orders for new service or to correct problems, record the order information in a database, and reconfigure network technologies to begin providing the new service or to correct the problem. In addition, the '505 patent includes an automated bill generator which uses database information to automatically generate requests for payment from customers. The input to the system is the initial order entry, and the completed, computer-dependent task result is the output. While comprehensive, this system facilitates only those tasks that can be completed without human interaction.

The prior art focuses on design and maintenance of telecommunications services from a technical support perspective, rather than from an administrative and accounting perspective. The result of such a focus is specialization of the circuit provisioning system for particular network components or architectures. Such specialization leads to additional fragmentation whereby proprietary data for different telecommunication service providers exist on separate systems, and no single circuit provisioning system contains all information necessary to administer multiple circuits for several different customers. At least for this reason, the prior art falls short of providing customized and consolidated billing services for several different customers, client/server or network-based database access, or interactive interfaces for convenient reference and display of multiple circuit information.

In contrast to the prior art, the present invention is designed and intended to facilitate human interactions for technical support and administrative tasks involving telecommunications services. Resolution of the logistical problems associated with tracking equipment and personnel across a range of telecommunications service providers requires the use of a user-friendly interface for managing the database. The present invention recognizes that human technicians and administrators will manage the network and facilitates their interaction. The present invention offers a practical, cost efficient management system for overcoming telco fragmentation and re-introducing circuit design and maintenance accountability.

IV. SUMMARY OF THE INVENTION

The present invention helps facilitate human interactions for technical support and administrative tasks by associating customer, contract, circuit, equipment, key personnel, billing, and telco information in a database for efficient data presentation and information retrieval. Resolution of the logistical problem of tracking circuit information is achieved by organizing the information and displaying important data concurrently. Toward that end, the system modules comprising the invention share all of the circuit inventory data available, and graphical user interfaces for each module display relevant information together.

The main interface of the system is composed of a set of system modules, each module providing functions for entry and display of information relevant to the circuit provisioning process. The primary modules accessible from the main interface include the customer, contract, circuit, telco, key personnel, trouble ticket, and data presentation modules. A billing module is accessible in multiple forms, such as a separate interactive entry and display module or as a standalone executable with access to databases contained in the other primary modules. Within each of these modules, a system operator may input, edit, delete or review information and this information can then be displayed in that same module and other modules. The overall effect is a user-friendly interface for quickly accessing important data relevant to circuit provisioning and related administrative tasks.

An important aspect of the present invention is its ability to sort important tasks by deadline date and remind the operator of past, present, or future telecommunications service events. For example, many telecommunications service providers offer service at a fixed cost for a specified time period, and then allow continued use of its services after the time expires, but at a higher monthly cost. The present invention avoids unintentional expiration of service arrangements by reminding system operators of impending expiration of the agreed period. This aspect can result in significant monetary savings for large telecommunications customers.

V. BRIEF DESCRIPTION OF THE DRAWINGS

The foregoing and other advantages and features of the invention will become more apparent from the detailed description of the preferred embodiments of the invention given below with reference to the accompanying drawings in which:

FIG. 7 is a sample screen image of the telco module graphical user interface;

FIG. 8 is a sample screen image of the key personnel module graphical user interface;

FIG. 9 is a sample screen image of the trouble ticket module graphical user interface;

VI. DETAILED DESCRIPTION OF THE DRAWINGS AND OF THE PREFERRED EMBODIMENT

The present system is designed to be dynamic and thus the hardware needed to implement it from embodiment to embodiment varies considerably.

Figure 1:
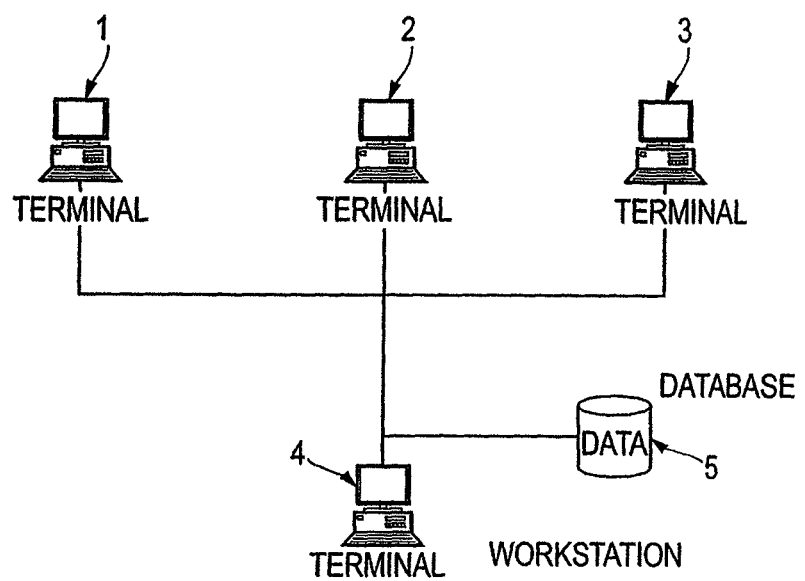
FIG. 1 is a diagram of an on-site implementation of the current system.
Figure 2:
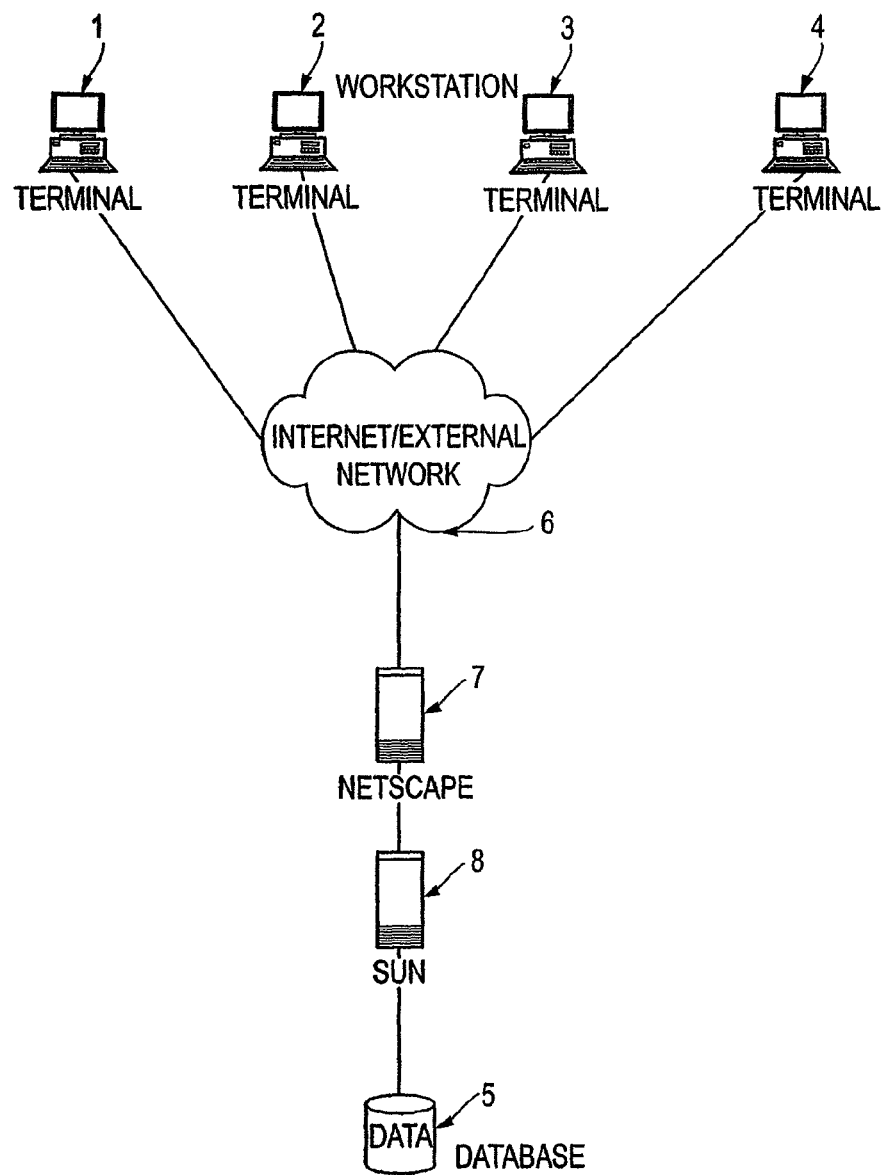
FIG. 2 is a diagram of an off-site implementation of the current system.

The present invention can be run on an internal network as shown in FIG. 1 or over an external network (including the Internet) as shown in FIG. 2 or on a single PC or on any combination thereof. Data-entry operators or database users are connected to a network database 5 through the use of a personal computer (PC). An administrator is also connected to the network database 5 through a PC. Those of ordinary skill in the art will understand that a PC with a 166 MHz Pentium processor, 32 megabytes of RAM, an operating system (such as Windows '95 or higher) and a 56 k modem or network connection are adequate to implement the present invention. In its most basic embodiment the entire system can be provided on a single PC with a 166 MHz Pentium processor, 32 megs of RAM, a 5 Gigabyte hard-drive, and an operating system (such as Windows NT or similar operating system) to which multiple users have access. Likewise, in a hardwired embodiment, similar components may be provided in a hardwired form.

Another implementation involves web server software running in a client/server software environment that is used to produce an external network configuration. As shown in FIG. 2, an external network, such as the Internet 6, is provided. A server 7, such as a Netscape ES server, is provided that is operationally connected to a workstation 8, such as a Sun Microsystems Workstation. The database 5 or portions of it may be provided externally or internally to one or more of the PCs or workstations.

Figure 3:
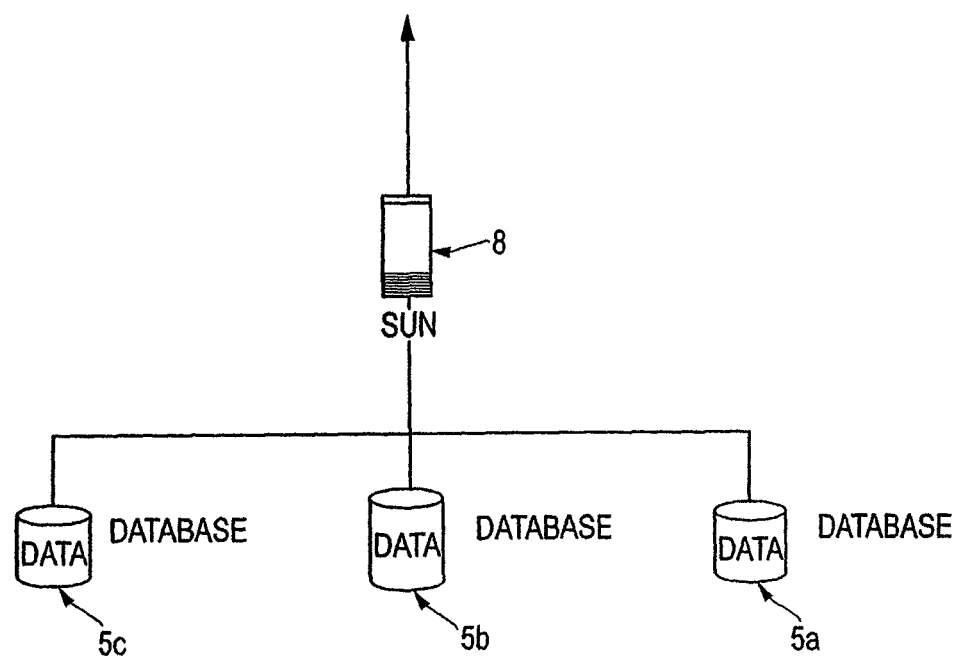
FIG. 3 is a schematic of an alternative database configuration.

The types of databases used may vary considerably. As shown in FIG. 3, the database 5 may have multiple sub-databases, which may be partitioned portions of database 5 or may be additional databases. The sub-databases may include a section to hold data associated with multiple telecommunication service providers 5*a*, trouble ticket data 5*b* and/or billing data 5*c*. The multiple databases may be located at different locations and data may be shared on a periodic basis or though other conventional means.

As the present invention is designed to operate dynamically, those of ordinary skill in the art will recognize that it may be installed over a variety of computing systems. For example, in addition to the single network system shown in FIG. 1, it is expressly contemplated that multiple networks and/or sub-networks may be incorporated and that the present invention may be implemented in whole or in part over all or over selected portions of the network. For example, the circuit management functions, such as entering telco, equipment, and circuit inventory information, may be implemented in a sales department-based system, the contract management functions, such as associating contract identification numbers and terms with telcos, may be implemented in an administration-based system, and the trouble ticket functions, such as entering and tracking reports of network problems, may be implemented in the systems used by technical support.

Figure 4:
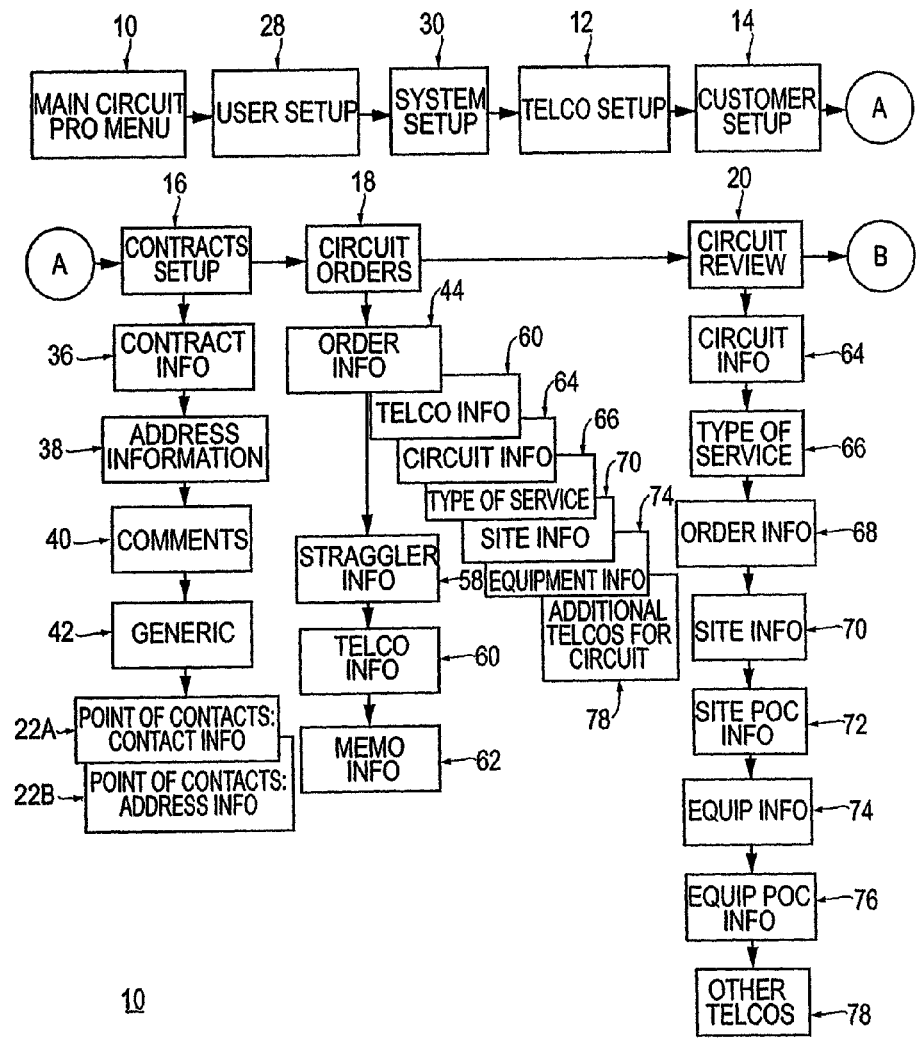
FIG. 4 is a partial flow chart of the main interface module, including the telco, contract, and circuit modules.

The operation of the present invention is best understood if one begins with the main interface module 10, shown in FIG. 4. When the multiple aspects of the present invention are described, those of ordinary skill in the art will recognize how the system can be used most efficiently and effectively.

The present invention works by associating customer, contract, circuit, equipment, key personnel, billing, and telco information in a database for efficient presentation and information retrieval. Resolution of the logistical problem of tracking circuit information is achieved by organizing the information and displaying important data concurrently. Toward that end, the system modules comprising the invention share all of the circuit inventory data available, and graphical user interfaces for each module display relevant information together.

The main circuit module 10 aggregates all of the component submodules of the invention in a single user interface. An operator may input, delete, edit, and review circuit inventory data by accessing modules from the main interface module 10 shown in FIGS. 4 and 5. Inputs preferably come from a user's interaction with a keyboard and mouse. It is also expressly contemplated that some information may be retrieved from non-system databases and converted into a usable format.

Figure 10:
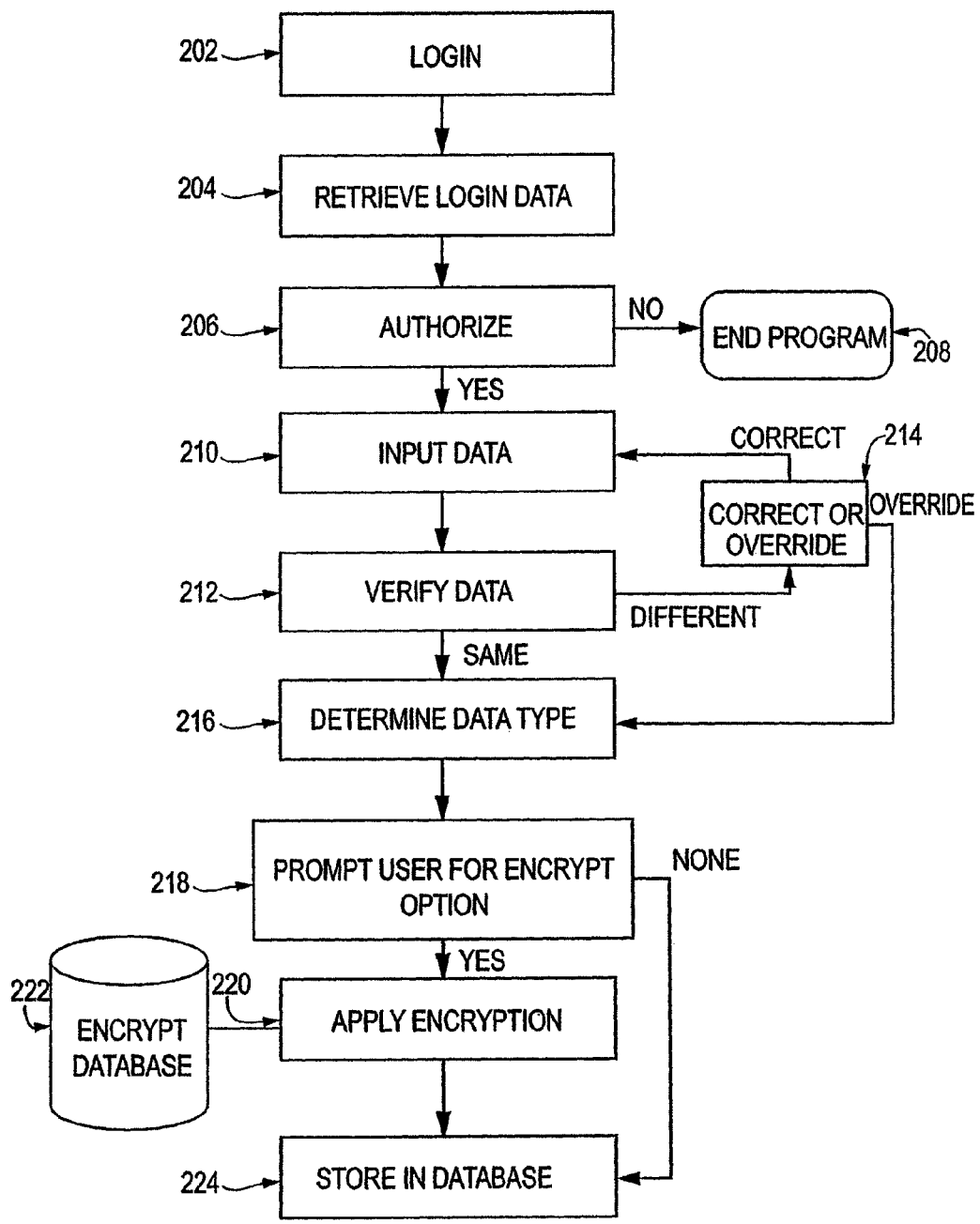
FIG. 10 is a flow chart illustrating a system sessions.

All inputs may be encrypted to increase security or to limit access to data to users with appropriate authorization, an example of which is shown in FIG. 10. Encryption may include, but is not limited to, symmetric encryption, asymmetric encryption or message digest algorithms. Data may be de-encrypted as it is retrieved for use by a module. The steps of encrypting and de-encrypting will not be repeated throughout the specification, but those of ordinary skill in the art will recognize that whenever data is discussed it may be encrypted and de-encrypted based on the flow of the data.

In the example of FIG. 10, an operator commences a system session by logging in 202, to which the system responds by retrieving login data 204 and comparing to operator inputs in an authorization step 206. If the operator is not authorized, the system halts 208 to prohibit unauthorized access. If the operator is authorized, then data may be entered 210 in one of the several system modules accessible from the main interface module. After the data is inputted, the system verifies the data 212 by checking it against previously-stored database information. One embodiment of the data verification step is described in FIG. 11 and discussed below. If the entered data does not match previously-stored database information, the operator is prompted to correct the entry or override 214 the verification function, indicating that new data is being entered. After verification, the system determines the data type 216 and prompts the operator for encryption instructions 218. If the operator chooses not to encrypt the entered data, the data is immediately stored in the database 224 corresponding to the data type determined in block 216. If the operator chooses an encryption option, the system retrieves details of that option from the encryption database 222 and applies the encryption method chosen by the operator 220. The system then stores the encrypted data in the correct database 224.

Figure 11:
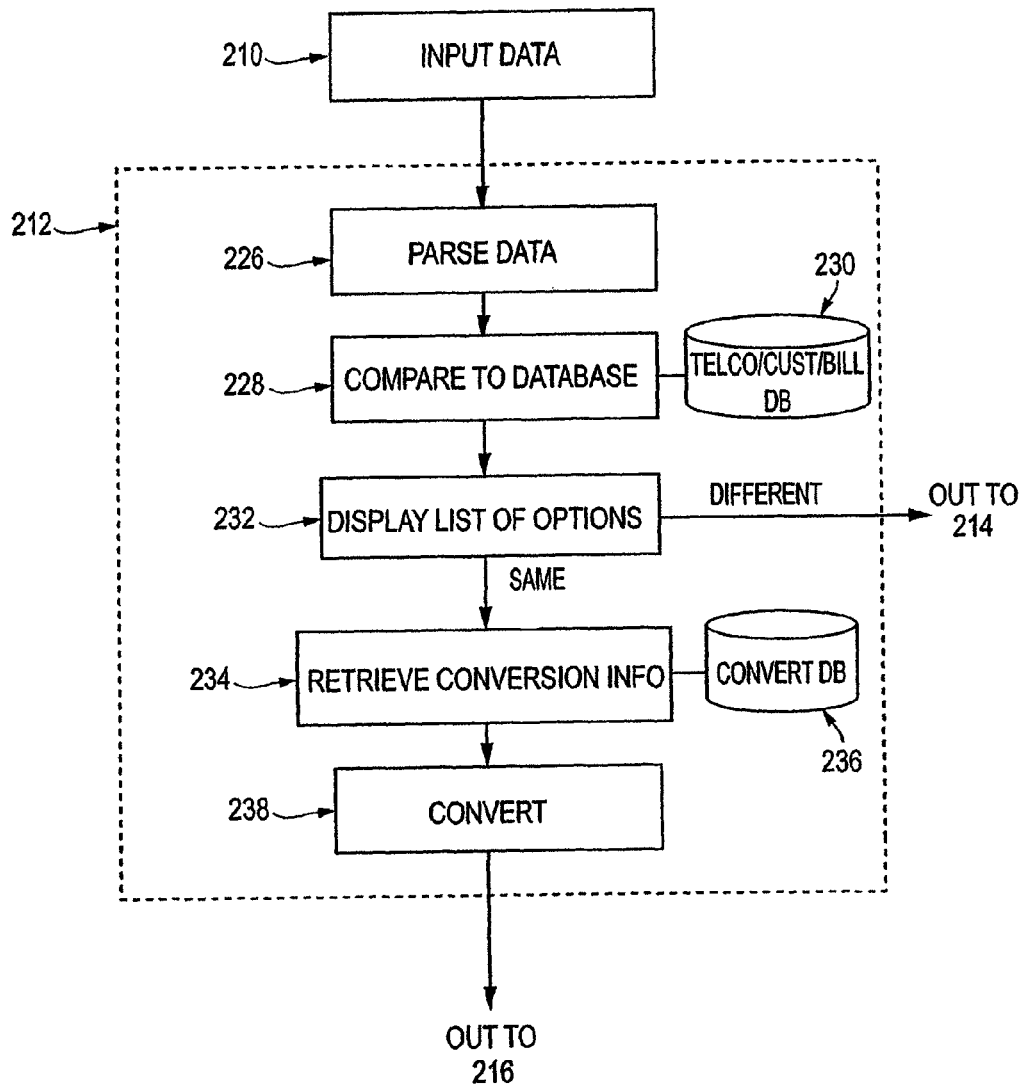
FIG. 11 is a flow chart illustrating a verification step.

FIG. 11 shows the contents of data verification block 212 for one embodiment of the present invention. The data verification step starts by parsing the entered data 226 in order to identify data units suitable for comparison with the various databases available. Each data unit is then compared 228 to data contained in the databases available 230. The system then displays a list of choices corresponding to data similar to the data just entered. If the user does not choose one of the offered options, the system branches to correct or override block 214. If the user does choose one of the offered options, the data is converted to a standardized index corresponding to previously-entered data. This conversion includes retrieval of conversion information 234 from the conversion database 236 and application of the conversion to the entered data 238. The conversion database 236 is simultaneously updated to record the fact of conversion in order to store associations between differing methods of identifying differing telcos, equipment, or other telecommunications service details.

Figure 5:
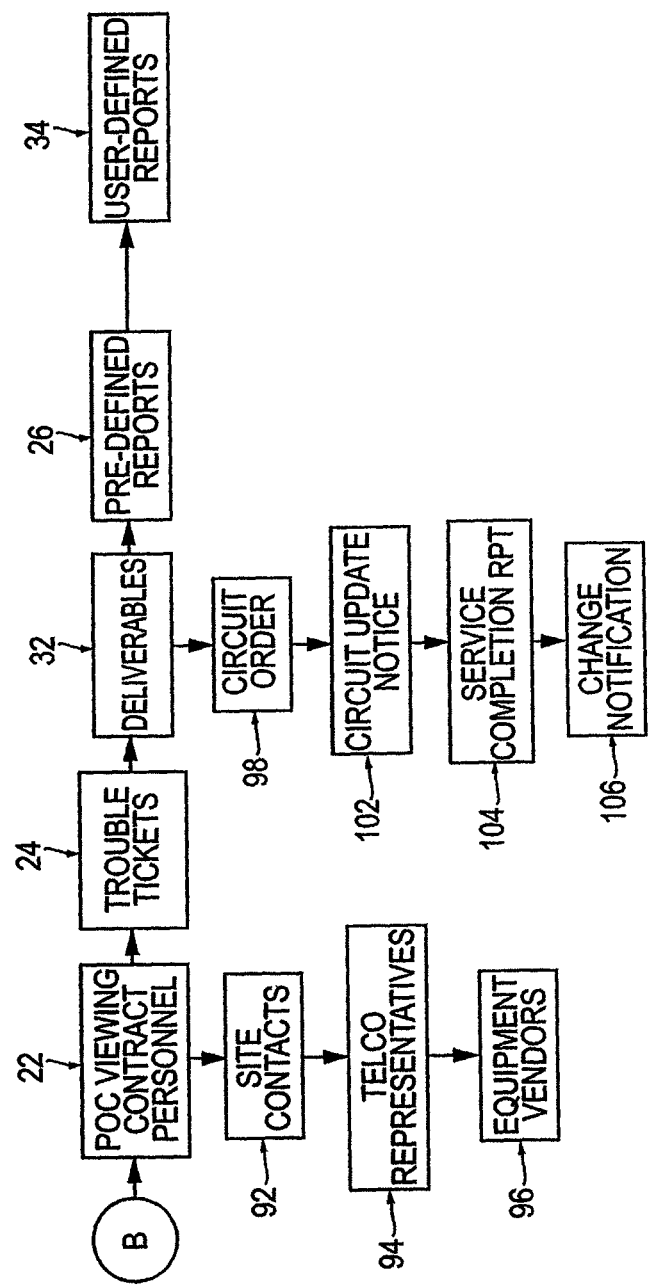
FIG. 5 is a second partial flow chart of the main interface module, including the key personnel, trouble ticket, and data presentation modules.

FIG. 4 shows those modules generally associated with circuit initiation, including at least the telco module (telco setup) 12, the customer module (customer setup) 14, the contract module (contract setup) 16, the circuit order module (circuit orders) 18, the circuit service module (circuit review) 20, and the security module (user setup) 28. FIG. 5 shows those modules generally associated with circuit maintenance, including at least the key personnel module (POC Viewing) 22, the trouble ticket module (Trouble Tickets) 24, and the data presentation module (reports) 26. From the main interface module, the operator may also access elements for entering local configuration characteristics (system setup) 30, shown in FIG. 4, and elements for generating specialized reports (deliverables and user-defined reports) 32 and 34, respectively, shown in FIG. 5. Additional modules may also be accessible from the main interface module. The main interface module is used only to access the other system modules and elements.

The customer module 14 is used to enter information relevant to a specific customer. Customers are the actual entities purchasing telecommunications services from the telcos. The invention is equipped to handle any number of customers and their associated circuit inventory data. Information entered into the database and displayed using the customer module 14 includes at least the customer name, a numerical identification code assigned to each customer, an abbreviated customer name, customer address, and space for miscellaneous customer-associated information.

A customer name conversion submodule similar to that described above and depicted in FIG. 11 may be used to convert the customer's name into a standardized index that may be used to represent the customer's name in data tables. The use of a standardized index may also be used to catch spelling mistakes that may occur during data entry. As shown in FIG. 11, entered data is parsed 226 and compared to previously-entered data 228 stored in the customer database 230. Next, similar names may be displayed 232 as information is entered into the system using the customer names that have already been assigned an index value. The operator then may choose one of the assigned indexes or indicate lack of a match. If an assigned index is chosen, conversion information is retrieved 234 and the proper conversion is applied 238. Those of ordinary skill in the art will recognize that whenever customer-specific data is stored or retrieved that a conversion process may take place in which the index is accessed.

The customer module 14 also includes basic database management functions, such as customer name lookup, creation of new customers, editing of customer information, and deletion of customers. Once entered, customer information is available for display in other system modules. In a preferred embodiment, all data is stored in a data table based on the customer's assigned index. This assists in the sorting of information and limits multiple entries and input errors.

The contract module 16 is used by an operator to store information relevant to individual subdivisions of a customer. Large customers, such as multi-national or governmental entities, often order telecommunications services as a number of independent divisions or departments. Each circuit must be maintained and tracked in order to provide accountability regardless of the telcos that are involved. The contract module 16 interacts with the customer database and the telco database. The telco database keeps track of contact and service information for the telcos. Potential telco providers can be retrieved based on the place and type of circuit that is being requested. This permits the customer to select the telco that best suits their needs for the circuit in question. Information entered into the database and displayed in the contract module 16 includes at least a contract name or description (contract info) 36, key personnel contact information (address information) 38, start and stop dates for the contract, contract number, sub-contract number, contract length, contract year, task number, sub-task number, type of contract (i.e. labor, materials, equipment, etc.), and performance period (i.e. monthly, quarterly, etc.). Additional functions available in the contract module 16 include at least the following: simple customer and contract lookup and space for entering comments (comments) 40 or other information (generic) 42. Once entered, contract information is shared with other modules, such as key personnel contact information 22a and address information 22b, and often displayed alongside customer information to identify the ultimate customer and payment source.

Using the circuit order 18 and the circuit service 20 modules, system operators enter and display data relevant to the telecommunications circuits ordered by the customer. A circuit is analogous to a path extending from the geographical location at which data to be transmitted originates to the destination geographical location. From a logical standpoint, a circuit is also analogous to an account, for which an individual transaction is comparable to an individual network event. For either paradigm, multiple circuits can be defined for each contract, and separate system modules are used for data-entry versus display of circuit information.

The circuit order module 18 allows the operator to enter basic circuit information. Data entered and displayed includes information required to initiate network access for a circuit (order info) 44, such as purchase order number, circuit identification number, order type, circuit creation and termination dates, order terms, and special services requested. Also included in the circuit order module 18 are interfaces for entering and displaying straggler information (straggler info) 58.

The telco database is updated on a regular basis. The circuit order module 18 may also include a database verification function to ensure that only data that has been updated within a prescribed period of time, for example 30 days, 60 days, or 90 days, is used. If the database has not been updated within the prescribed limit, the user is informed and/or required to obtain an updated database. As was discussed earlier, the telco database may be encrypted and may be made available for remote or local use.

Figure 12:
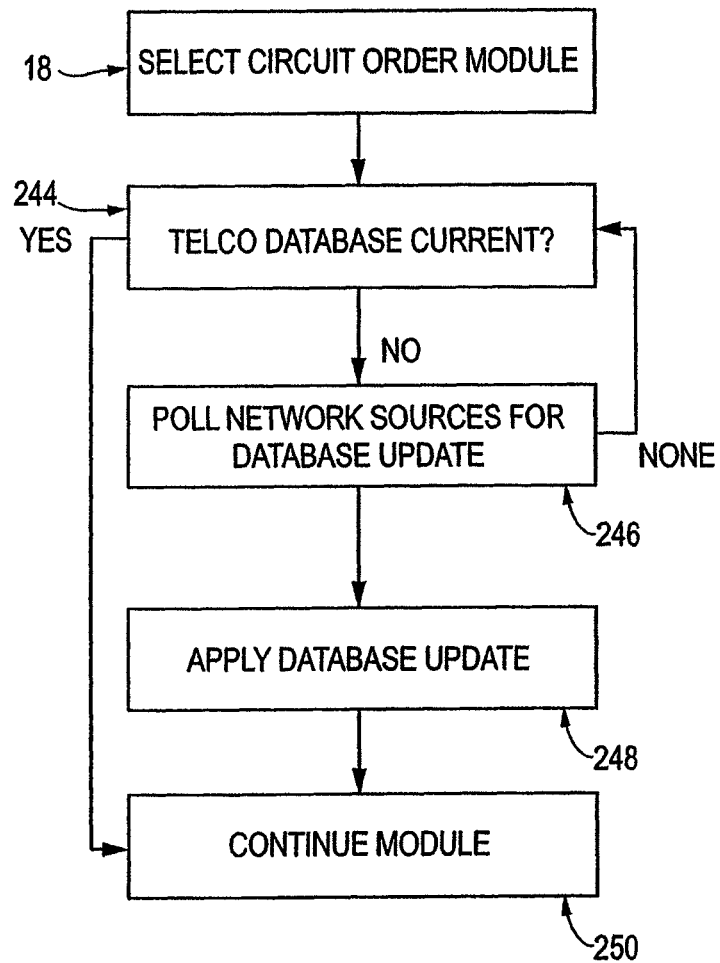
FIG. 12 is a flow chart of a verification function.

One embodiment of a database verification function is shown in FIG. 12. When the circuit order module 18 is selected, the expiration date of the telco database, whether 30, 60, or 90 days after the last update, is compared with the current date at block 244. If the telco database has not expired, the circuit order module continues at block 250. If the telco database has expired, the system polls network sources for a current telco database update at block 246. If no telco database updates are available, the operator is warned and the expiration date of the telco database is extended. The system logic then returns to the date comparison block 244, where the database is deemed current, and the circuit order module continues at block 250. If a database update is available at block 246, the update is applied to synchronize the telco database with the most current version available at block 248, and the circuit order module continues at block 250.

The present invention also compensates for the use of different codes by different telcos to describe, the same or similar services. Thus, the present invention may also comprise a uniform standard code (USOC) table which may be used to convert codes of individual telcos into a standard code format. Although it is expressly contemplated that the USOC is used primarily for standardization of billing, the USOC may also be used to unify the screen entries with varying codes. The USOC may be provided separately or as part of any of the aforementioned databases or indexing/conversion functions. The USOC may be encrypted and may also include update information.

A straggler information submodule 58 may also be used and provides a powerful tool for keeping customers up-to-date in their dealings with the multiple components, or legs, of each circuit. For each circuit, individual telco information can be entered and displayed in order to isolate those legs for which network service is in jeopardy due to expiring or non-existent service arrangements. In addition, a reminder service is available to inform the operator and the customer when service arrangements are nearing termination for any leg of any circuit. This function is useful to avoid changes in important service characteristics, such as service costs, and can result in major cost savings for large telecommunications customers. It also permits a usable reminder feature that is applicable to all circuit orders regardless of the telcos that are involved. For example, at present telcos do not inform customers when their contract is up and simply roll the contract to a month-to-month basis. The difference in expense can be rather large. When multiple circuits are involved tracking each renewal date can be an insurmountable task. The straggler module 58 assists in identifying renewals and general circuit progression regardless of the telcos involved.

The circuit order module 18 also includes a submodule for displaying telco information (telco info) 60 and miscellaneous circuit information (memo info) 62 for each circuit when desired by the operator. The telco information submodule 60 displays all telcos associated with a given circuit and, for each telco, at least key personnel information is available.

The circuit service module 20 is the primary display interface for circuit information after a circuit is installed and operating. For each circuit, circuit service requests and their current status can be called up and displayed by the operator alongside a wide variety of circuit characteristics organized into display sub-modules. The first submodule displays an overview of circuit characteristics (circuit info) 64, including at least customer identification data, operational status, service type (i.e. T-1, T-3, ATM), and primary telco contact information. The second circuit service submodule (type of service) 66 displays more detailed information on service type, including at least access speed, hardware configuration, service quality notes, and traffic information. The third submodule (order info) 68 displays circuit initiation information similar to that described above in the discussion of the circuit order module 18. The fourth submodule (site info) 70 displays location-specific information for each geographical location associated with a circuit. This submodule reflects the fact that circuits are multi-legged, for example a cross-country circuit may originate in San Diego, travel to Denver, then to Chicago, and on to New York. For each location, the system is capable of recording service and key personnel contact information, displayed in the fifth submodule (site POC info) 72. The sixth submodule (equip info) 74 displays equipment-specific information for each network component. This submodule reflects the fact that, for each site, any number of individual network components, for example hardware and software devices, may be included in the inventory database. For each piece of equipment at a site, a contact person may be entered and displayed in the seventh submodule (equip POC info) 76. Finally, the eighth submodule (other telcos) 78 displays contact information for the non-primary or secondary telcos for a circuit.

The key personnel module 22 shown in FIG. 5 is the primary display interface for basic contact information. Operators may use this module to get in touch with other persons associated with a telecommunications service, such as repair personnel. Contact information is organized according to role categories in the circuit provisioning market. Submodules allow configuration of the display to show contact information for personnel involved in contract administration (contract personnel) 22, personnel associated with a given site for a circuit (site contacts) 92, representatives of each telco (telco representatives) 94, and vendors of the network components included in the circuit inventory (equipment vendors) 96. Within each submodule, contact information can be filtered according to operator preferences to display only those contacts associated with logical subdivisions of the database. For example, site contact information can be filtered to display contacts for a single customer, contract, or circuit.

The trouble ticket module (trouble tickets) 24 includes an interface used by an operator to enter and review problem reports. When a customer reports a problem, an operator enters a description of the problem for tracking by system administrators. Problem tracking helps administrators monitor the completion of repair tasks and assists in the diagnosis of future problems. The trouble ticket module maintains historical records of the trouble tickets for each circuit, including at least contact information for the person reporting trouble, date and time of the report, and current status of the problem. In a preferred embodiment, this module also displays information in a format convenient for problem tracking and resolution, simultaneously showing at least the trouble ticket history for a circuit, customer and contract information, and descriptions of circuit characteristics and events. The data presentation module 26 assists a system operator in collecting large amounts of information available in system databases. Commonly-requested reports are available from the data presentation module 26, for example a listing of all customers, all contracts, or all circuits for a customer or contract. Most data entered using other system modules is available for reporting, including customer, contract, circuit, key personnel, telco, equipment, and straggler information. One example of a pre-defined report would be a listing of all circuits ordered by a customer including, for each circuit leg, descriptions of the service type requested, current service operational status, primary telco, rate information, terms of service, begin and end dates, and repair service telephone number.

Customized reports are also available in the user-defined reports submodule 34, in which an operator may define a personalized report format and choose the information to be displayed from among database records. Report definitions prepared in external commercial software, such as Microsoft Access, are available to generate reports in a format desired by the customer. Similar to the data presentation module 26, the user-defined reports module 34 shares access to databases created in other system modules, including at least customer, contract, circuit, key personnel, trouble ticket, equipment, straggler, and telco data.

The deliverables module 32 assists the operator in generating a series of specialized reports for customer notification of particular administrative events. Following a common telecommunications event, an operator may generate a specialized report using this module and forward it to the customer affected. For example, after a circuit order has been received and administratively processed, the circuit order submodule 98 may be used to generate a report of the circuit order to acknowledge receipt of the order from the customer. Similarly, after a circuit has been updated, the update is reported to the customer using a report generated by the circuit update notice submodule 102. Once a requested service has been prepared for the customer, the customer is notified with a report generated by the service completion report submodule 104. In addition, any impending or present changes to telecommunications service is reported to customers with a report generated by the change notification submodule 106.

The overall effect of the foregoing modules of the present invention is to collect and organize data for repair service tracking and contract administration. A vital part of contract administration in the telecommunications service industry is prompt and accurate accounting, including paying the bill for services rendered. When dealing with many telcos providing many different services in different locations, it is valuable to high-volume customers to have all of their telecommunications costs listed in a single bill. A single bill helps the customer identify and separate charges accruing for different circuits as well as manage expensive resources by closely tracking costs of that resource. Without such a consolidated bill, customers face a difficult task in matching charges for a given service to the contract established to pay for the service. The present invention recognizes the need for consolidated billing in the telecommunications service environment and provides a module for the integration of billing services into the circuit provisioning system.

Figure 6:
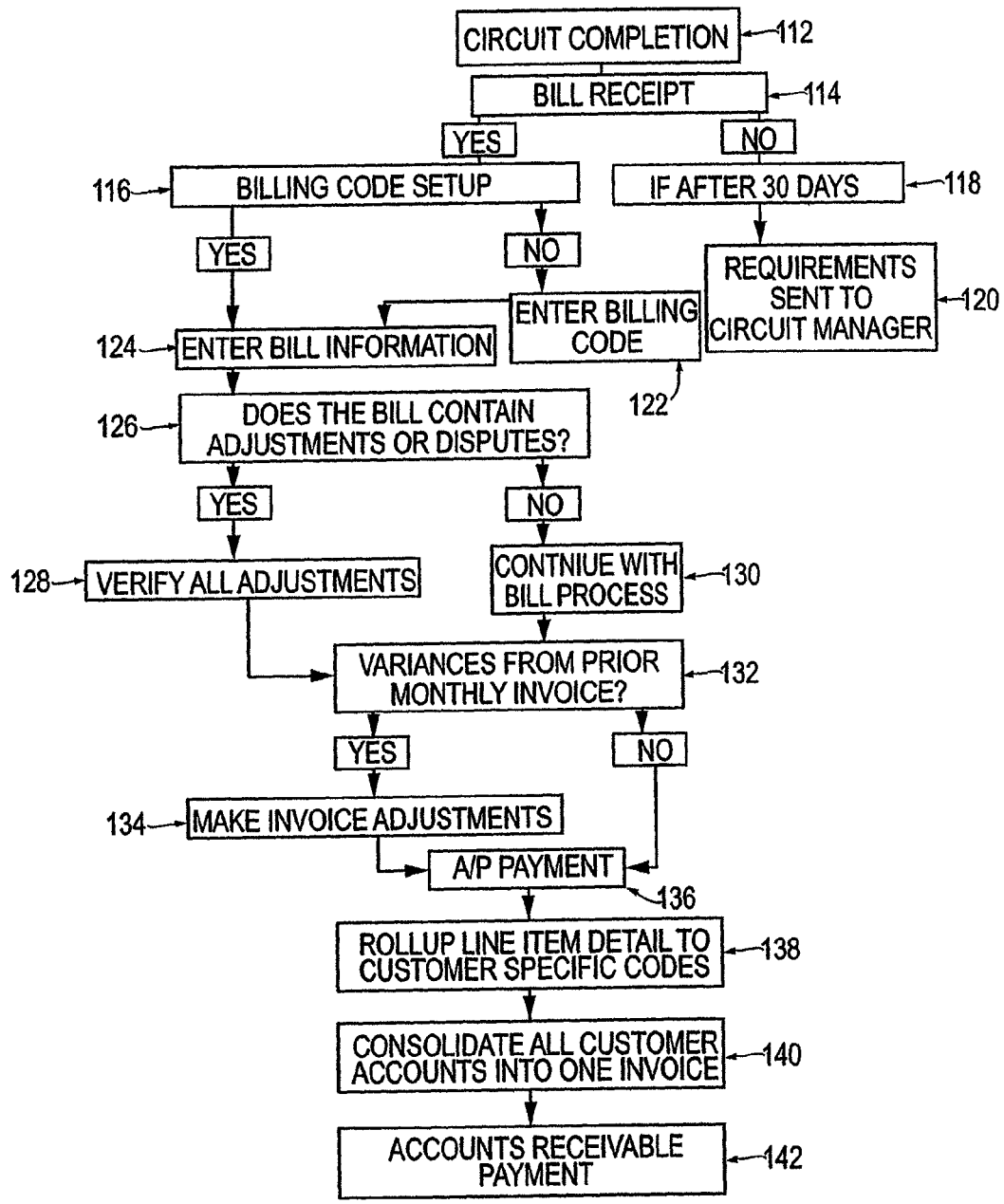
FIG. 6 is a logic diagram of the billing module.

In a preferred embodiment of the present invention, billing operations would be handled according to the logic diagram shown in FIG. 6. When telecommunications service has commenced for a circuit (circuit completion) 112, administrative personnel may receive a request for payment, represented by the bill receipt block 114. If no bill is received within 30 days of the date when a bill was expected (block 118), the circuit manager is notified (block 120). If a bill is received, the billing database is consulted to determine whether billing codes have been assigned for the telco and circuit (block 116), and if not, billing codes are assigned and entered (block 122) into the billing database. If billing codes are already assigned, or otherwise after code assignment, a description of the bill and its contents is entered (block 124) into the billing database. The bill is then analyzed to determine whether the bill requires adjustments or contains disputed information (block 126). If so, disputes are resolved and any adjustments to the bill are verified (block 128). If no adjustments or disputes are outstanding, no action is taken and the billing process continues (block 130). The bill is then compared to the prior monthly invoice provided to the customer for the same service, if the service has been in operation for more than one monthly billing cycle (block 132). If the bill varies from the prior monthly invoice, adjustments to the invoice are made (block 134) and if there is no variation, no adjustments are made. After the bill has been analyzed and verified, it is forwarded to accounts payable for payment (block 136).

At the end of the billing cycle, all billing information for a customer for the current billing cycle is collected into a single invoice, a process known as rollup and consolidation. During rollup, line item details provided separately in each bill, such as one-time charges incurred during the current billing cycle, are formatted according to customer instructions (block 138). During consolidation, all billing information for all circuits of a customer is aggregated into a single invoice for convenient review by the customer (block 140). The aggregated invoice is then forwarded to accounts receivable (block 142) for receipt of payment from the customer.

One example of the present apparatus and method would start with an operator entering login and password information in order to start a system session. If the operator were authorized to use the main interface module, the system would display the main interface module, and the operator would select one of the submodules available. The operator would first select the customer submodule and enter customer information corresponding to the customer for whom telecommunications service is to be administered. Once customer information is entered, the operator would exit the customer submodule and select the contract submodule. Within the contract submodule, the operator would enter contract information corresponding to the specific subdivision or the specific accounting entity of the customer requesting service. Once contract information was entered, the operator would exit the contract submodule and select the telco submodule. Within the telco submodule, the operator would enter data describing the different telecommunications service providers with which customers would be expected to do business. Preferably, this information would be available over a network and hence pre-entered by other personnel. The operator would then review the telco information, exit the telco submodule, and select the circuit submodule. Within the circuit submodule, the operator would enter data corresponding to a specific order by a customer for a telecommunications pathway. The data entered would include at least a listing of the circuit legs, a description of the type of telecommunications service requested, and data identifying the telecommunications service providers along each leg. Once circuit information was entered and reviewed, the operator would exit the circuit submodule and select the key personnel submodule. Similar to the telco submodule, information describing some key personnel would be available over a network, although others would be entered by the operator. Once key personnel information was complete, the operator would exit the key personnel submodule.

Thereafter, when telecommunications service problems would arise, a non-operator could inform a system operator concerning the nature of the problem and the operator would select the trouble ticket module. Within the trouble ticket module, the operator would enter a description of the service problem and associate the description with the correct circuit, telco, contract, and customer. Whenever desired, such as at a later date, the system operator could review the status of the problem. The operator would then display relevant key personnel data in order to contact repair personnel. At the end of the monthly billing cycle, an operator would select the billing submodule and generate consolidated billing reports for transmission to the customer.

Figure 7:
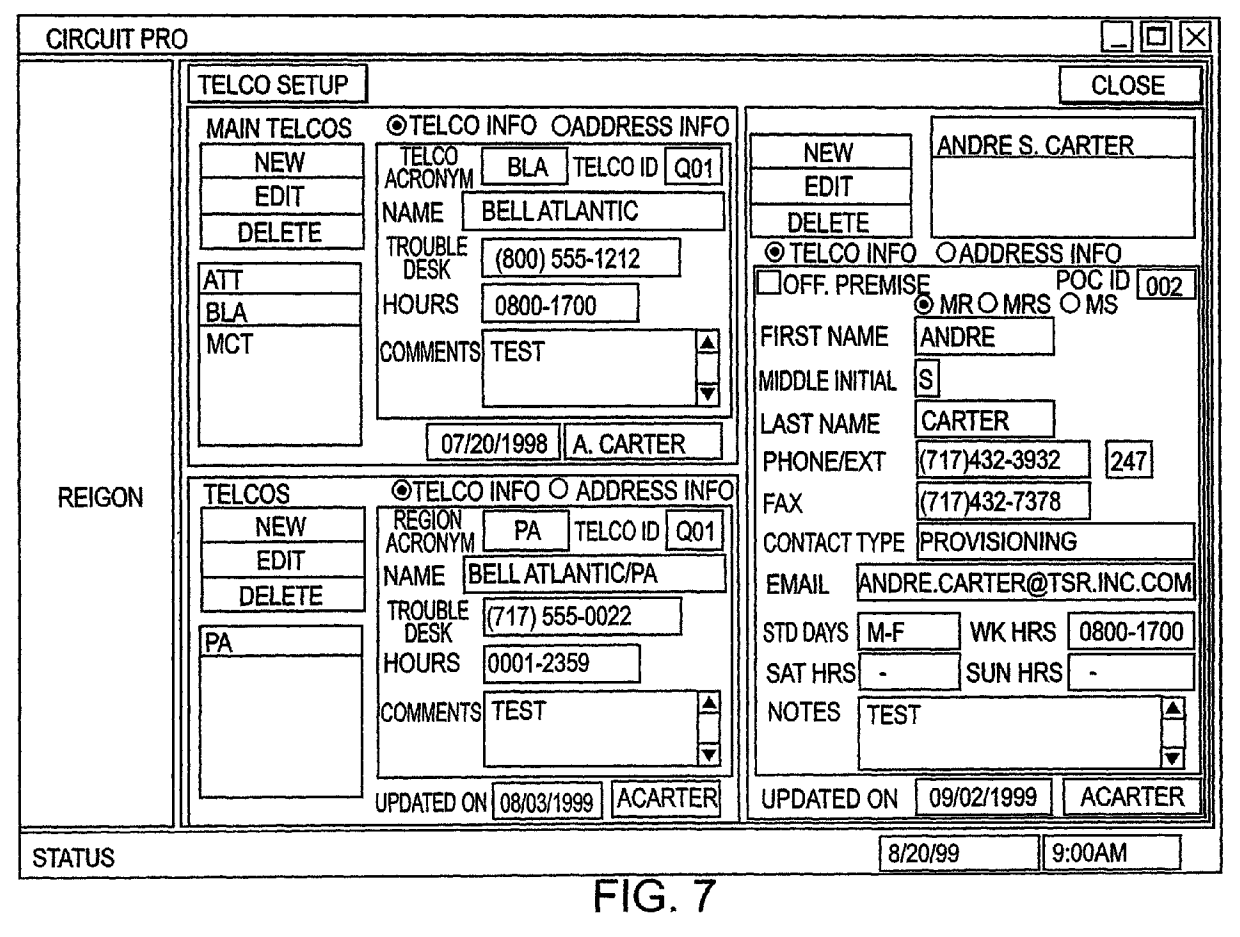
Figure 9:
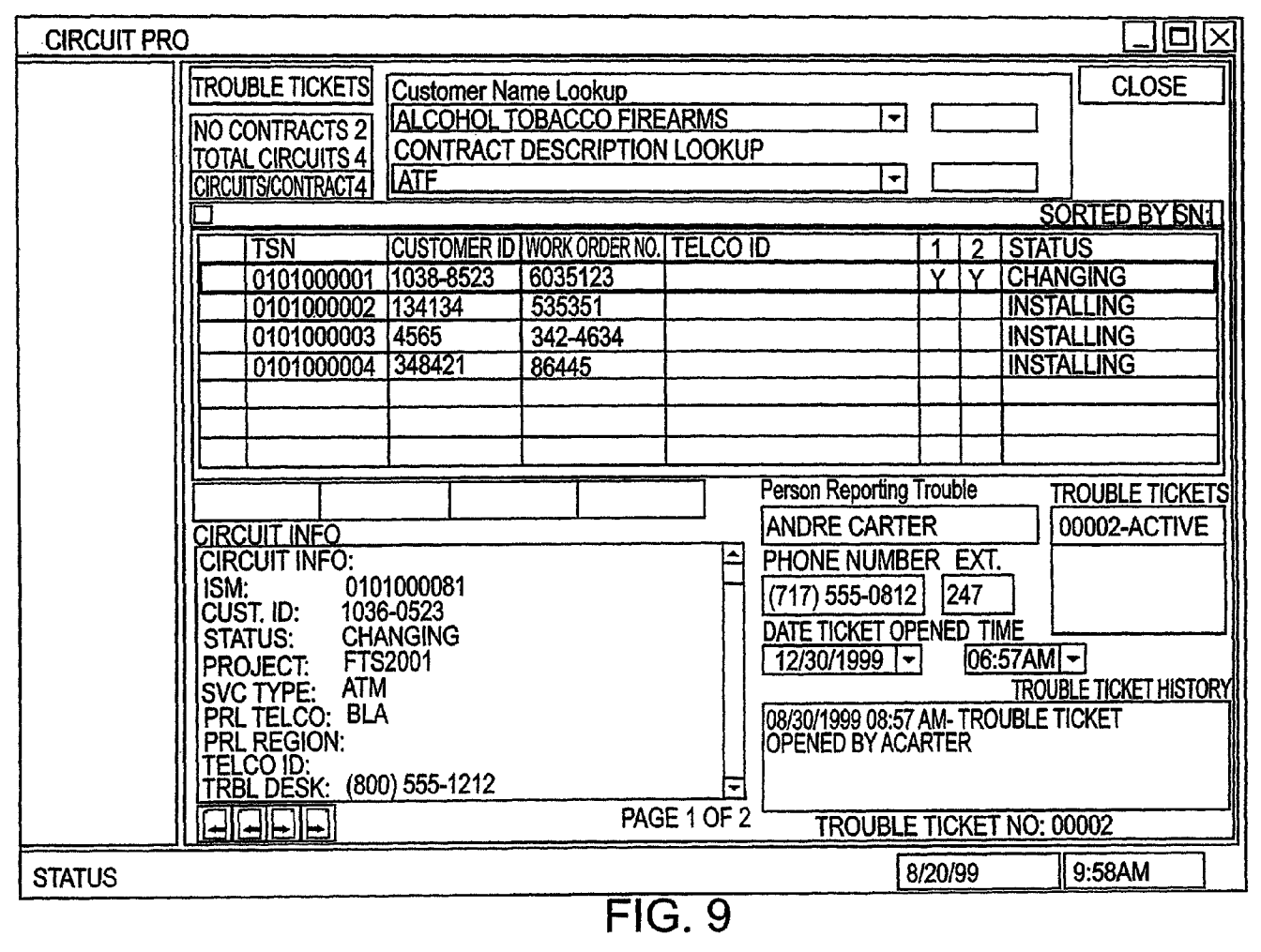

The details of implementation of the present invention may vary from one embodiment to another, but a preferred embodiment would utilize a user friendly interface, examples of which are represented in the sample screen images shown in FIGS. 7, 8, and 9.

A portion of the disclosure of this patent document contains material which is subject to copyright protection. In particular, FIGS. 7, 8, and 9 are copyrighted. The copyright owner has no objection to the facsimile reproduction by anyone of the patent document or the patent disclosure, as it appears in the Patent and Trademark Office patent file or records, but otherwise reserves all copyright rights whatsoever.

FIG. 7 shows a sample image of a computer display produced by the telco submodule for an embodiment implemented in a popular operating environment available for personal computers, Microsoft Windows 95. Information useful for contacting a telco or for contacting key personnel associated with that telco is displayed alongside information identifying the telco and its location.

FIG. 8 shows a similar sample image produced by the key personnel submodule. Information useful for contacting key personnel is displayed alongside associated location and customer data for a specified contract. FIG. 9 shows a sample image produced by the trouble ticket submodule. Information identifying the relevant customer and contract are displayed alongside repair history data, circuit description data, and data identifying the person reporting the problem.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A telecommunications circuit provisioning and administration system for recording telecommunications service data comprising:
   a customer submodule providing access to customer information;
   a contract submodule providing access to contract information;
   a circuit submodule providing access to a database of circuit information, each circuit being logically associated to said contract information;
   a conversion submodule which converts data information into a standardized format;
   a billing submodule that consolidates billing information corresponding to a plurality of telecommunications circuits into a single invoice; and
   a data presentation submodule that displays telecommunications service data available over a network alongside previously entered data in a desired format for easy reference during human interactions concerning transitioning of an original installed service to a replacement service, including de-installation of said original installed service.

2. A telecommunications circuit provisioning and administration system according to claim 1, wherein said billing submodule formats line item details according to user-defined parameters.

3. A telecommunications circuit provisioning and administration system according to claim 1, further comprising a change notification submodule that provides a report on impending or present changes to a telecommunications service of a customer.

4. A telecommunications circuit provisioning and administration system according to claim 1, further comprising a telecommunications service provider submodule for providing access to a database of telecommunication service provider information, wherein said database of telecommunications service provider information comprises a plurality of telecommunications service provider records, each of said telecommunications service provider records comprising data describing telecommunication service providers.

5. A telecommunications circuit provisioning and administration system according to claim 1, further comprising a key personnel submodule providing access to a database of key personnel information, wherein said database of key personnel information comprises a plurality of key personal records, each of said key personnel records comprising data beneficial for communicating with a person or group of persons.

6. A telecommunications circuit provisioning and administration system according to claim 1, further comprising a trouble ticket submodule providing access to a database of trouble ticket information, wherein said database of trouble ticket information comprises a plurality of trouble ticket records, each of said trouble ticket records comprising data describing a particular telecommunications event.

7. A telecommunications circuit provisioning and administration system according to claim 1, wherein said customer submodule provides access to a database of customer information, wherein said database of customer information comprises a plurality of customer records, each of said customer records comprising data describing a consumer of telecommunications services.

8. A telecommunications circuit provisioning and administration system according to claim 1, wherein said billing submodule exists as a standalone program.

9. A telecommunications circuit provisioning and administration system according to claim 1, wherein the data presentation submodule provides access to a database of data presentation formats.

10. A telecommunications circuit provisioning and administration system according to claim 9, wherein access includes the operations of entering, deleting, modifying, storing, and displaying data.

11. A telecommunications circuit provisioning and administration system according to claim 9, further comprising a security submodule providing access to a database of system operator information for regulating access to system submodules and regulating operations each operator is privileged to perform.

12. A computerized method of presenting telecommunications service charges, comprising:
receiving from a database customer description information processed through a conversion submodule;
receiving a description of a telecommunications pathway of circuit information processed through a conversion submodule;
receiving telecommunications service charge information for a plurality of telecommunications circuits of the telecommunications pathway processed through a conversion submodule, the plurality of telecommunications circuits being provided by multiple vendors;
receiving telecommunications service provider description information processed through a conversion submodule;
processing all received information in order to logically connect and aggregate the received information;
presenting, through an interactive display interface, billing information that aggregates the telecommunications service charge data from the multiple vendors providing the plurality of telecommunications circuits; and
displaying telecommunications service data available over a network alongside previously entered data in a desired format for easy reference during human interactions concerning transitioning of an original installed service to a replacement service, including de-installation of said original installed service.

13. A method of tracking telecommunications service and provisioning circuits according to claim 12, further comprising:
entering a subdivision customer description data into a database of contract information;
entering data beneficial for communicating with a person or group of persons into a database of key personnel information; and
entering telecommunications event data into a database of trouble ticket information.

14. A method of tracking telecommunications service and provisioning circuits according to claim 12, further comprising:
generating a notice of impending changes in telecommunications service or cost related to a single circuit or component of a circuit.

15. A method of tracking telecommunications service and provisioning circuits according to claim 12, further comprising:
entering operator access regulation instructions into a database of system operator information; and
providing system access only to those system operators permitted according to said database of system operator information.

16. A method of tracking telecommunications service and provisioning circuits according to claim 12, further comprising:
generating monthly billing reports and payment requests in a format convenient for customer review.

17. A method of tracking telecommunications service and provisioning circuits according to claim 12, further comprising:
generating monthly billing reports and payment requests in a format specified by a user.

18. A computerized telecommunications circuit provisioning and administration system for recording telecommunications service data comprising:
a customer submodule providing access to customer information;
a contract submodule providing access to contract information;
a circuit submodule providing access to circuit information, each circuit being logically connected by the computer to a respective contract;
a conversion submodule which converts data information into a standardized format;
a change notification submodule outputting reports notifying of current or impending changes to telecommunications service based on the customer information, the circuit information and the contract information; and
a data presentation submodule displaying telecommunications service data available over a network alongside previously entered data in a desired format for easy reference during human interactions concerning transitioning of an original installed service to a replacement service, including de-installation of said original installed service.

19. A telecommunications circuit provisioning and administration system according to claim 18, wherein the change notification submodule provides the reports notifying of current or impending change to a customer.

* * * * *